Oct. 21, 1958  G. A. LYON  2,857,210
WHEEL COVER
Filed Sept. 24, 1956
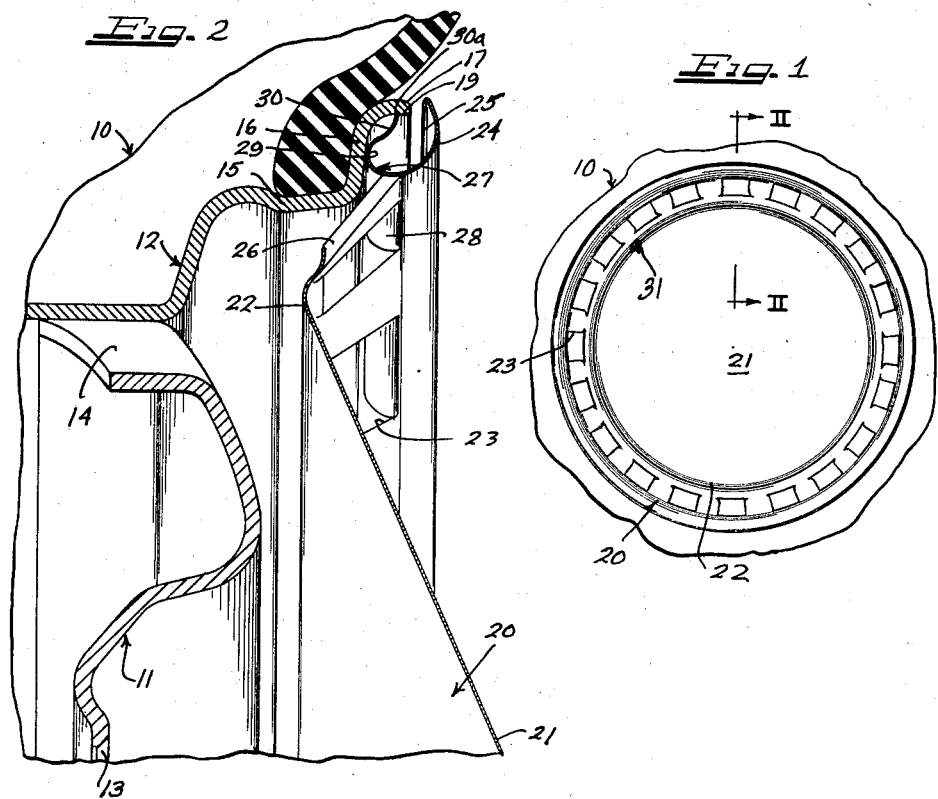
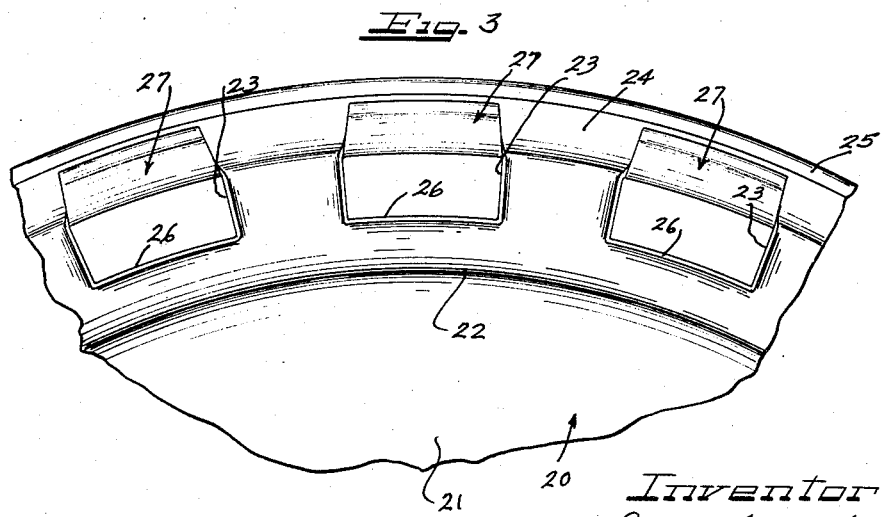
Inventor
GEORGE ALBERT LYON

United States Patent Office 2,857,210
Patented Oct. 21, 1958

2,857,210

WHEEL COVER

George Albert Lyon, Detroit, Mich.

Application September 24, 1956, Serial No. 611,521

3 Claims. (Cl. 301—37)

This invention relates generally to a wheel structure and more particularly to an ornamental wheel cover member for protective retained disposition on the outer side of a vehicle wheel.

Due to the constant public demand made upon automobile manufacturers to provide the public with an outstanding distinctive automobile, the automobile wheel cover manufacturers are called upon by the automobile manufacturers to help meet this demand by providing fanciful highly outstanding wheel covers which are capable of functioning in accordance with modern day engineering requirements.

In order to cope with some of the engineering problems, such as the tendency of modern day wheels to become overheated during operation, the present wheel structure is provided with openings in the wheel and cover openings in the cover. These openings are arranged in an effective manner for promoting air circulation to cool the wheel. Another problem which the manufacturers are faced with concerns providing a low cost cover structure which is capable of developing gripping characteristics so that the cover may not be readily disengaged from the wheel during operation and which may upon the use of proper tools be removed from the wheel without harming the cover so that it may subsequently be replaced on the wheel and coact with the rim as effectively as before.

Accordingly, an object of this invention is to provide a highly ornamental and fanciful wheel cover member.

Still another object of this invention is to provide a new and improved wheel cover construction which is capable of engaging a wheel under tension in detachable assembly.

A further object of this invention is to provide a new and improved cover and wheel assembly which promotes air circulation through the wheel.

Yet another object of this invention is to provide an ornamental wheel cover which may be economically produced on a large production scale.

According to the general features of this invention there is provided in a wheel structure, a wheel having rim and body parts including connected axial, radial and terminal axial rim flanges and with the wheel having circumferentially spaced wheel openings, a cover member having an intermediate dished portion provided with circumferentially spaced cover openings and with the cover material removed to form the openings turned under and providing circumferentially spaced resiliently deflectable retaining finger extensions and which are arranged in a common circle having a diameter slightly at variance with said terminal rim flanges, said fingers being in detachable cover retaining cooperation with the rim and said cover openings being generally opposite the wheel openings to facilitate air circulation therethrough to cool the wheel, said fingers each being wedge shaped and having an outer edge in gripping biting engagement with the rim, said cover having generally radially and axially outwardly extending side edges at opposite sides of said cover openings to reinforce the cover and to provide a channel for directing air through said cover openings, said finger extensions being C-shaped and have an intermediate portion capable of bottoming against said radial rim flange and a radially outwardly extending terminal portion having a radially facing edge in edgewise biting engagement with the terminal rim flange.

Other objects and features of this invention will more fully become apparent in view of the following detailed description taken in conjunction with the accompanying sheet of drawings illustrating therein a single embodiment and in which:

Figure 1 is a fragmentary side elevation of my wheel structure;

Figure 2 is an enlarged fragmentary cross-sectional view taken substantially along the lines II—II of Figure 1 looking in the direction indicated by the arrows; and Figure 3 is an enlarged fragmentary rear elevation of my wheel cover.

As shown on the drawings:

The reference numeral 10 indicates generally my wheel structure having a body part 11 and a multi-flanged drop center type of tire rim 12. The tire rim has centrally located openings 13 through which lugs carried on an axle of an automobile (not shown) may be inserted and to which nuts may be threaded onto the lugs to clamp the body part 11 to the axle.

At circumferentially spaced intervals generally at the junction of the body part 11 with the tire rim 12 is provided wheel openings 14. These openings open rearwardly onto the brake drum area of the wheel and may be associated with conventional means generally at the brake drum area of the wheel for promoting air circulation axially outwardly to the wheel openings 14.

The tire rim 12 has an intermediate axial flange 15 which is connected at its axially outer end to a generally radially outwardly extending rim flange 16 which is in turn also connected at its outer end to a generally axially outwardly extending terminal rim flange 17. The terminal rim flange 17 is slightly curled to provide a shoulder 19.

In overlying disposition upon my vehicle wheel is my highly ornamental and attractive wheel cover member 20. The wheel cover member 20 may be made from any suitable material although it will be appreciated excellent results may be attained through making the wheel cover from stainless steel. This is especially true since a wheel cover of this type has a longer lasting attractive appearance and resists the weather elements. Also, as here, where the retaining means are formed out of the cover material the use of stainless spring steel facilitates the development of the requisite resiliency in the retaining means so that the cover may be self-sustaining upon a vehicle wheel.

The cover 20 includes an enlarged raised central crown portion 21 which is generally convexly curved and has an intermediate dished cover portion 22 disposed generally at the outer margin of the crown portion 21. The cover at the dished cover portion 22 extends first generally radially outwardly axially inwardly and then radially and axially outwardly. It is on the radially and axially outwardly extending surface of the intermediate dished portion 22 where circumferentially spaced cover openings 23 are provided. Each of the openings 23 are positioned generally opposite the wheel openings 14 and face to a certain extent the intermediate rim flange 15.

Disposed at the outer margin of the dished portion 22 is a generally radially and axially outwardly extending cover terminal portion 24 which terminates in an underturned reinforcing bead 25 which is disposed in face to face close proximity to the terminal rim flange 17.

The openings 23 are struck out and turned under and formed into generally axially rearwardly extending edges 26. One of the edges, namely the radially and axially outermost edge is so formed to provide resilient finger extensions 27. Each of the finger extensions 27 are adapted to bottom against the rim flange 16 and are adapted to coact with the shoulder 19 in such a manner that the cover 20 is maintained in detachable backed up retaining engagement upon the wheel. Each of the extensions 27 are generally C-shaped and each include a radially inner curved base portion 28, an intermediate portion 29, and a radially outwardly extending dished portion 30. The portion 30 terminates in a radially facing edge 30a for edgewise engagement with rim flange 17 behind the shoulder 19. The cover margin 24 is dished axially outwardly with its curvature continued in the curved base portion 28 to stiffen the base portion and enable the dished margin to effectively utilize the stiffness of the cover margin.

When air is circulated through the wheel openings 14, it is directed toward the intermediate flange 15 and after it strikes the intermediate flange 15 it is deflected axially outwardly through the wheel openings 23. The air may be channelled between the side edges 23 as it is moved axially outwardly and directed toward and against the baffle or finger portion 28. It is in this manner that circulation of air through the wheel is promoted.

The cover 20 may be assembled upon the wheel by generally axially aligning the finger extensions 27 with the terminal rim flange 17 and upon the application of an axial force the cover may be pressed into snap-on, pry-off bottomed engagement with the vehicle wheel. It will be noted the intermediate finger portions 29 are bottomed against the radial rim flange 16 and in this manner inward deflection of the cover is resisted so that the retaining extensions 27 may be protected. In the present instance, when the cover 20 is in assembly on the wheel, the valve stem 31 extends through the cover.

To remove the cover from the wheel a suitable pry-off tool may be inserted underneath the bead 25 and upon the application of an axial force the margin 24 may be caused to be pried outwardly with the result that the force is transferred through the margin 24 of the cover in such a manner that the radially outwardly extending terminals 30 and edges 30a may be lifted out of engagement and slid over and along the radially inner surface of the terminal rim flange 17 until the cover is removed.

It will be understood that modifications and variations may be effected without departing from the scope of the novel concepts of the present invention.

I claim as my invention:

1. In a wheel structure, a wheel having rim and body parts including connected axial, radial and terminal axial rim flanges and with the wheel having circumferentially spaced wheel openings, a cover member having an intermediate dished portion including a radially and axially outwardly-extending dish segment with the inner and outer ends of the dish segment being disposed on radially opposite sides of the connection between the axial and radial rim flanges with the segment provided with circumferentially spaced cover openings opposite the connection of the axial and radial rim flanges and with the cover material removed from the dish segment at the area of the cover openings opposite the connection of the axial radial rim flanges turned under at the radially outer edge of the cover openings and providing cricumferentially spaced resiliently deflectable retaining finger extensions confronting the radial rim flange and which are arranged in a common circle having a diameter slightly at variance with said terminal rim flanges, said fingers being in detachable cover retaining cooperation with said terminal rim flange and said cover openings being generally opposite the wheel openings to faciltiate air circulation therethrough to cool the wheel.

2. In a wheel structure, a wheel having rim and body parts including connected axial, radial and terminal axial rim flanges and with the wheel having circumferentially spaced wheel openings, a cover member having an intermediate dished portion including a radially and axially outwardly extending dish segment with the inner and outer ends of the dish segment being disposed on radially opposite sides of the connection between the axial and radial rim flanges with the segment provided with circumferentially spaced cover openings opposite the connection of the axial and radial rim flanges and with the cover material removed from the dish segment at the area of the cover openings opposite the connection of the axial and radial rim flanges turned under at the radially outer edge of the cover openings and providing circumferentially spaced resiliently deflectable retaining finger extensions confronting the radial rim flange and which are arranged in a common circle having a diameter slightly at variance with said terminal rim flanges, said fingers being in detachable cover retaining cooperation with said terminal rim flange and said cover openings being generally opposite the wheel openings to faciltiate air circulation therethrough to cool the wheel, said fingers each being wedge-shaped and having an outer edge in gripping biting engagement with the terminal axial rim flange, said cover having generally radially and axially outwardly extending side edges at opposite sides of said cover openings reinforcing the cover and providing a channel for directing air through the cover and wheel openings.

3. In a wheel structure, a wheel having rim and body parts including connected axial, radial and terminal axial rim flanges and with the wheel having circumferentially spaced wheel openings, a cover member having an intermediate dished portion including a radially and axially outwardly-extending dish segment with the inner and outer ends of the dish segment being disposed on radially opposite sides of the connection between the axial and radial rim flanges with the segment provided with circumferentially spaced cover openings opposite the connection of the axial and radial rim flanges and with the cover material removed from the dish segment at the area of the cover openings opposite the connection of the axial and radial rim flanges turned under at the radially outer edge of the cover openings and providing circumferentially spaced resiliently deflectable retaining finger extensions confronting the radial rim flange and which are arranged in a common circle having a diameter slightly at variance with said terminal rim flanges, said fingers being in detachable cover retaining cooperation with said terminal rim flange and said cover openings being generally opposite the wheel openings to faciltiate air circulation therethrough to cool the wheel, said fingers each being wedge-shaped and having an outer edge in gripping biting engagement with the terminal axial rim flange, said cover having generally radially and axially outwardly extending side edges at opposite sides of said cover openings reinforcing the cover and providing a channel for directing air through the cover and wheel openings, and an axially outwardly dished cover margin disposed opposite the radial and terminal axial rim flanges, said finger extension having a curved base portion forming a continuation of the curvature of said dished cover margin and said finger extensions also having a radially and axially outwardly dished terminal provided with a resiliently yieldable gripping edge confronting and engaged with the terminal axial rim flange with said cover margin disposed axially outwardly and in confronting relation with respect to the dished terminal on the finger extension.

References Cited in the file of this patent

UNITED STATES PATENTS

| 2,094,326 | Lyon | Sept. 28, 1937 |
| 2,231,931 | Lyon | Feb. 18, 1941 |
| 2,368,238 | Lyon | Jan. 30, 1945 |
| 2,683,631 | Lyon | July 31, 1954 |